(12) United States Patent
Kamiya (10) Patent No.: US 6,801,498 B1
(45) Date of Patent: Oct. 5, 2004

(54) ASYNCHRONOUS TRANSFER MODE COMMUNICATION EQUIPMENT AND METHOD FOR SWITCHING VIRTUAL PATH OF SAME

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,905

(22) Filed: Feb. 23, 2000

(30) Foreign Application Priority Data

Feb. 24, 1999 (JP) ............................................. 11-047108

(51) Int. Cl.[7] .............................................. H04L 12/26
(52) U.S. Cl. ........................ 370/225; 370/397; 709/239
(58) Field of Search ............................. 370/397, 395.3, 370/395.31, 395.7, 400, 217, 225, 227, 228; 709/239

(56) References Cited

U.S. PATENT DOCUMENTS

| | | | | |
|---|---|---|---|---|
| 4,884,263 A | * | 11/1989 | Suzuki ........................ | 370/225 |
| 5,398,236 A | * | 3/1995 | Hemmady et al. .......... | 370/218 |
| 5,805,592 A | * | 9/1998 | Hatano ..................... | 370/395.7 |
| 5,959,972 A | * | 9/1999 | Hamami ...................... | 370/228 |
| 6,442,132 B1 | * | 8/2002 | Burns et al. ................. | 370/218 |
| 6,466,576 B2 | * | 10/2002 | Sekine et al. ............ | 370/395.1 |

FOREIGN PATENT DOCUMENTS

| | | |
|---|---|---|
| JP | 5-235983 | 9/1993 |
| JP | 6-232862 | 8/1994 |
| JP | 7-74747 | 3/1995 |
| JP | 11-32052 | 2/1999 |

* cited by examiner

*Primary Examiner*—Min Jung
(74) *Attorney, Agent, or Firm*—Sughrue Mion, PLLC (57) ABSTRACT

Asynchronous transfer mode communication equipment utilizing distributed processing to manage switching to standby virtual paths when a failure occurs in an active path, allowing an increased number of virtual paths to be reliably handled by the equipment, even in situations where multiple virtual paths simultaneously fail. Each unit controller within the ATM communication equipment has its own virtual path paired information table. When a failure occurs in a virtual path to a respective unit controller, the unit controller can immediately and independently select a standby path. This distributed processing increases the retrieval speed of standby paths and minimizes the delay to full restoration of service, avoiding the concurrent processing bottleneck that occurs in prior art designs when multiple active paths simultaneously fail and a central processor must sequentially redirect each unit controller.

12 Claims, 7 Drawing Sheets

| registration number | line setting information |||||||||||||
|---|---|---|---|---|---|---|---|---|---|---|---|---|
| | source connection |||||| destination connection ||||||
| | Bay | Unit | IF | HW | VPI | | Bay | Unit | IF | HW | VPI |
| 1 | 1 | 1 | 1 | 1 | 100 | | 2 | 1 | 1 | 1 | 101 |
| 2 | 2 | 1 | 1 | 1 | 101 | | 1 | 1 | 1 | 1 | 100 |
| 3 | 3 | 1 | 3 | 1 | 200 | | 3 | 2 | 3 | 1 | 201 |
| 4 | 3 | 2 | 3 | 1 | 201 | | 3 | 1 | 3 | 1 | 200 |
| 5 | 4 | 1 | 1 | 1 | 100 | | 4 | 1 | 3 | 1 | 101 |
| 6 | 4 | 1 | 3 | 1 | 101 | | 4 | 1 | 1 | 1 | 100 |
| 7 | 5 | 1 | 3 | 1 | 200 | | 5 | 2 | 3 | 1 | 201 |
| 8 | 5 | 2 | 3 | 1 | 201 | | 5 | 1 | 3 | 1 | 200 |

FIG.3

VP paired information table

| registration number | 0-system address | | | | 1-system address | | | |
|---|---|---|---|---|---|---|---|---|
| | Bay | Unit | IF | HW | VPI | Bay | Unit | IF | HW | VPI |
| 1 | 1 | 1 | 1 | 1 | 100 | 4 | 1 | 1 | 1 | 100 |
| 2 | 1 | 1 | 1 | 1 | 101 | 4 | 1 | 1 | 1 | 101 |
| 3 | 1 | 1 | 3 | 1 | 200 | 1 | 2 | 3 | 1 | 201 |
| 4 | 1 | 1 | 3 | 1 | 300 | 1 | 1 | 5 | 1 | 301 |

VP paired information table

| registration number | 0-system address | | | | | 1-system address | | | | |
|---|---|---|---|---|---|---|---|---|---|---|
| | Bay | Unit | IF | HW | VPI | Bay | Unit | IF | HW | VPI |
| 1 | 1 | 1 | 1 | 1 | 100 | 4 | 1 | 1 | 1 | 100 |
| 2 | 1 | 1 | 1 | 1 | 101 | 4 | 1 | 1 | 1 | 101 |
| 3 | 1 | 1 | 3 | 1 | 200 | 1 | 2 | 3 | 1 | 201 |
| 4 | 1 | 1 | 3 | 1 | 300 | 1 | 1 | 5 | 1 | 301 |

FIG. 7 (PRIOR ART)

| registration number | line setting information |||||||||||||
|---|---|---|---|---|---|---|---|---|---|---|---|---|
| | source connection |||||| destination connection ||||||
| | Bay | Unit | IF | HW | VPI | | Bay | Unit | IF | HW | VPI |
| 1 | 1 | 1 | 1 | 1 | 100 | | 2 | 1 | 1 | 1 | 101 |
| 2 | 2 | 1 | 1 | 1 | 101 | | 1 | 1 | 1 | 1 | 100 |
| 3 | 3 | 1 | 3 | 1 | 200 | | 3 | 2 | 3 | 1 | 201 |
| 4 | 3 | 2 | 3 | 1 | 201 | | 3 | 1 | 3 | 1 | 200 |
| 5 | 4 | 1 | 1 | 1 | 100 | | 4 | 1 | 1 | 1 | 101 |
| 6 | 4 | 1 | 3 | 1 | 101 | | 4 | 1 | 1 | 1 | 100 |
| 7 | 5 | 1 | 3 | 1 | 200 | | 5 | 2 | 3 | 1 | 201 |
| 8 | 5 | 2 | 3 | 1 | 201 | | 5 | 1 | 3 | 1 | 200 |

ASYNCHRONOUS TRANSFER MODE COMMUNICATION EQUIPMENT AND METHOD FOR SWITCHING VIRTUAL PATH OF SAME

BACKGROUND OF THE INVENTION

1. Field of the Invention

The present invention relates to asynchronous transfer mode communication equipment and a method for switching a virtual path of the same and more particularly to the asynchronous transfer mode communication equipment having a function to switch the virtual path based on a redundant structure for a remedy of the virtual path in the case of its failure and the method for switching virtual paths of the above asynchronous transfer mode communication equipment.

2. Description of the Related Art

Figure 4:
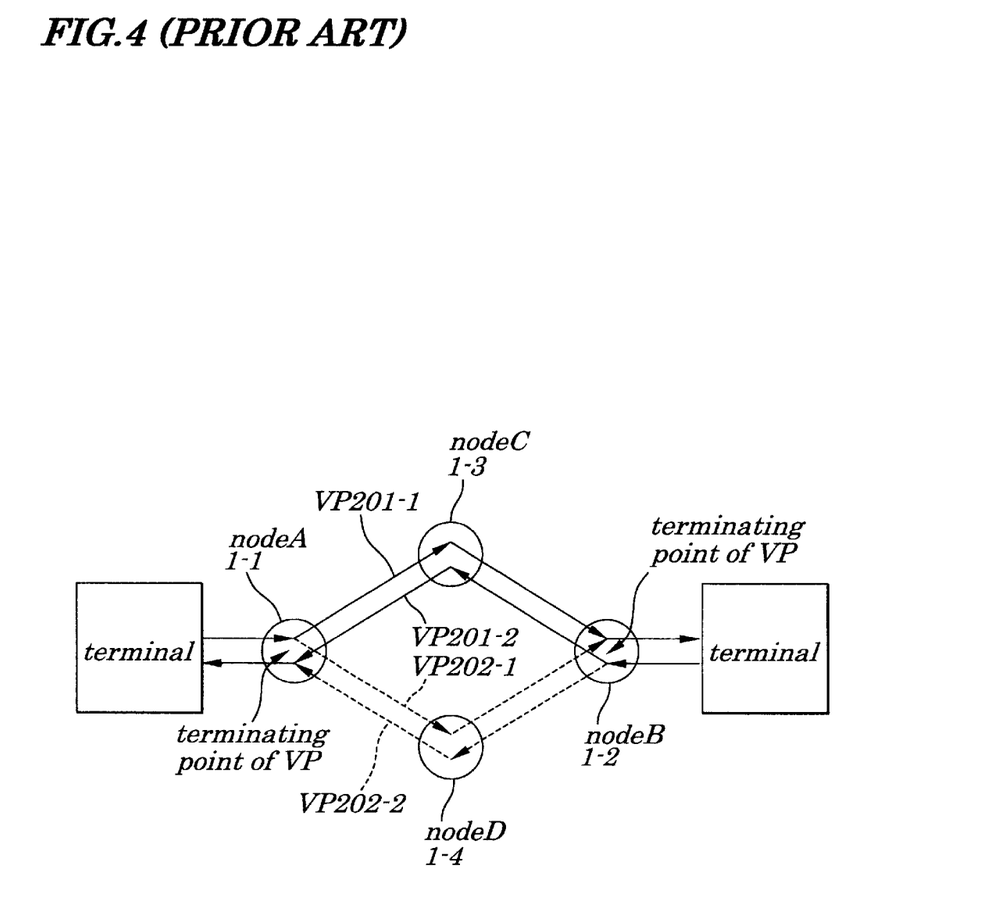
FIG. 4 is a schematic block diagram showing a general configuration of the ATM equipment for switching an active VP to a standby VP.

FIG. 4 is a schematic block diagram of general asynchronous transfer mode (hereinafter referred to as ATM) communication equipment used when its virtual path (hereinafter referred to as a VP) is switched. A conventional method for switching the VP will be hereinafter described by referring to FIG. 4. As shown in FIG. 4, the ATM communication equipment is provided with the VPs mounted dually and bidirectionally between a node A 1-1 constituting one terminating point of the VP and a node B 1-2 constituting the other terminating point of the VP, and one set of the VPs is used as active VPs and the other set of the VPs as standby VPs. If a failure occurs in the active VP, switching from the active VP to the standby VP is performed to prepare for malfunctions of a link and the node. In FIG. 4, the active VPs 201-1 and 201-2 are shown by solid lines being connected bidirectionally among the node A 1-1, a node C 1-3 and the node B 1-2. The node A 1-1 and the node B 1-2 constitutes each of terminating points for bidirectional sending and receiving of signals, while the standby VPs 202-1 and 202-2 used for bidirectional communication are shown by dotted lines among the node A 1-1, a node D 1-4 and the node B 1-2.

Next, operations of the ATM communication equipment will be described below. First, when the node B 1-2 receives a notice of a failure in the active VP201-1, the node B 1-2 starts to retrieve the corresponding VP202-1 from a VP paired information table containing information created by pairing information about the source VP with one about the switched VP and outputs a request for switching of the VP by using the standby VP 202-2.

When the node A 1-1 receives the request for switching the VP, in order to switch the VP from the active VP201-1 to the standby VP202-1 and from the active VP201-2 to the standby VP202-2, it retrieves the information from the VP paired information table to renew line setting information and to perform the switching of the VP. After the switching is complete, the node A 1-1 informs the node B 1-2 of the completion of the VP switching. When the node B 1-2 receives the notice of the completion of the VP switching, by renewing the line setting information, it performs the VP switching. By the above operations, the VP switching is now complete. That is, in the described conventional method for switching the VP, the terminating node B 1-2 having received the notice of the failure in the VP is adapted to inform the oppositely-disposed terminating node A 1-1 of the request for the VP switching and, after having confirmed the switching request, the node B 1-2 is adapted to perform the switching of the self-node.

Moreover, another conventional method for switching a VP is known in which a terminating node B 1-2 having received a notice of a VP failure firstly performs a switching of its own VP and, after having completed the switching, it informs an oppositely-disposed terminating node A 1-1 of a request for the VP switching and then performs the switching of the VP of the oppositely-disposed terminating node A 1-1.

As shown in the above two conventional methods for switching the VPs, when nodes A 1-1 and B 1-2 disposed at VP terminating points identify a switched VP, retrieving of the VP paired information table is necessary.

In the ATM communication equipment provided with conventional VP switching functions, both all line setting information tables within the equipment and the paired information tables created by pairing the active VP being in operation with the standby VP used for switching of the active VP are managed by a control section adapted to control whole equipment.

Therefore, the control section controlling the whole equipment, if there is any active VP requiring switching due to failures or the like, by retrieving necessary information from the table in which the VP paired information for the whole equipment is registered, detects a standby VP to be used as one constituting a pair of the VPs and performs the VP switching.

Figure 5:
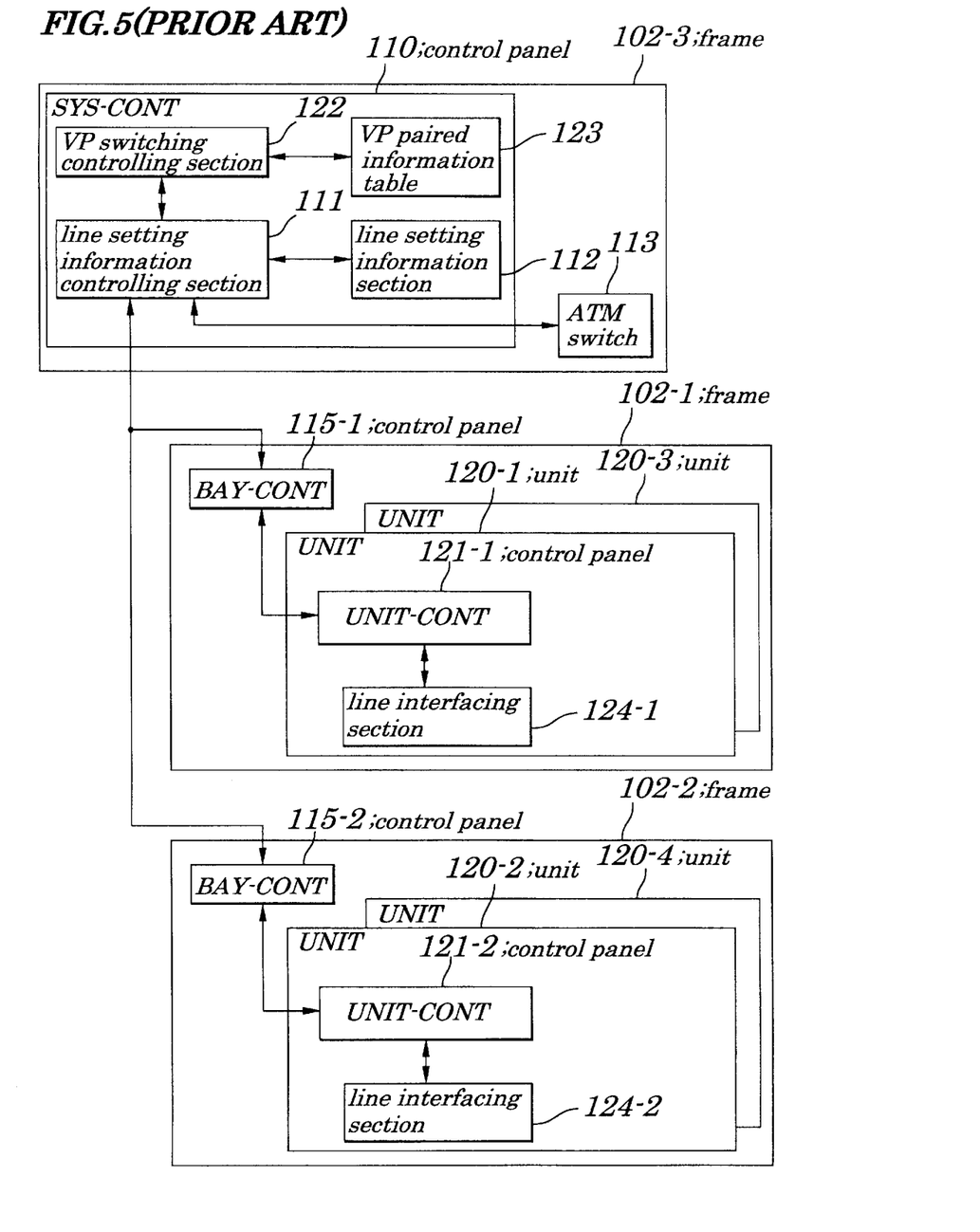
FIG. 5 is a schematic block diagram of configurations of an ATM communication equipment having a conventional VP switching function.

FIG. 5 is a schematic block diagram of configurations of ATM communication equipment having a conventional VP switching function.

As shown in FIG. 5, the ATM communication equipment is comprised of a control panel (SYS-CONT) 110 to control whole equipment, control panels (BAY-CONT) 115-1 and 115-2 to control frames 102-1 and 102-2, units 120-1 to 120-4 in the frames, line interfacing sections 124-1 and 124-2 mounted on the units 120-1 to 120-4, an ATM switch 113 and control panels (UNIT-CONT) 121-1 and 121-2 to control the units 120-1 to 120-2 and line interfacing sections 124-1 and 124-2.

The control panel (SYS-CONT110) contains a line setting information controlling section 111, a line setting information section 112, a VP switching controlling section 122 and a VP paired information table 123. Information from the line setting information section 112 is fed from the line setting information controlling section 111 through the control panels BAY-CONT 115-1 and 2 on each frame to the UNIT-CONT 121-1 and 121-2 on each of units 120-1 and 120-2 and then is set to each of the line interfacing sections 124-1 and 124-2. Also, information from the line setting information section 112 is set to the ATM switch 113 from the line setting information controlling section 111.

Next, operations of the line setting information section 112 and the VP paired information table 123 will be described.

Figure 6:
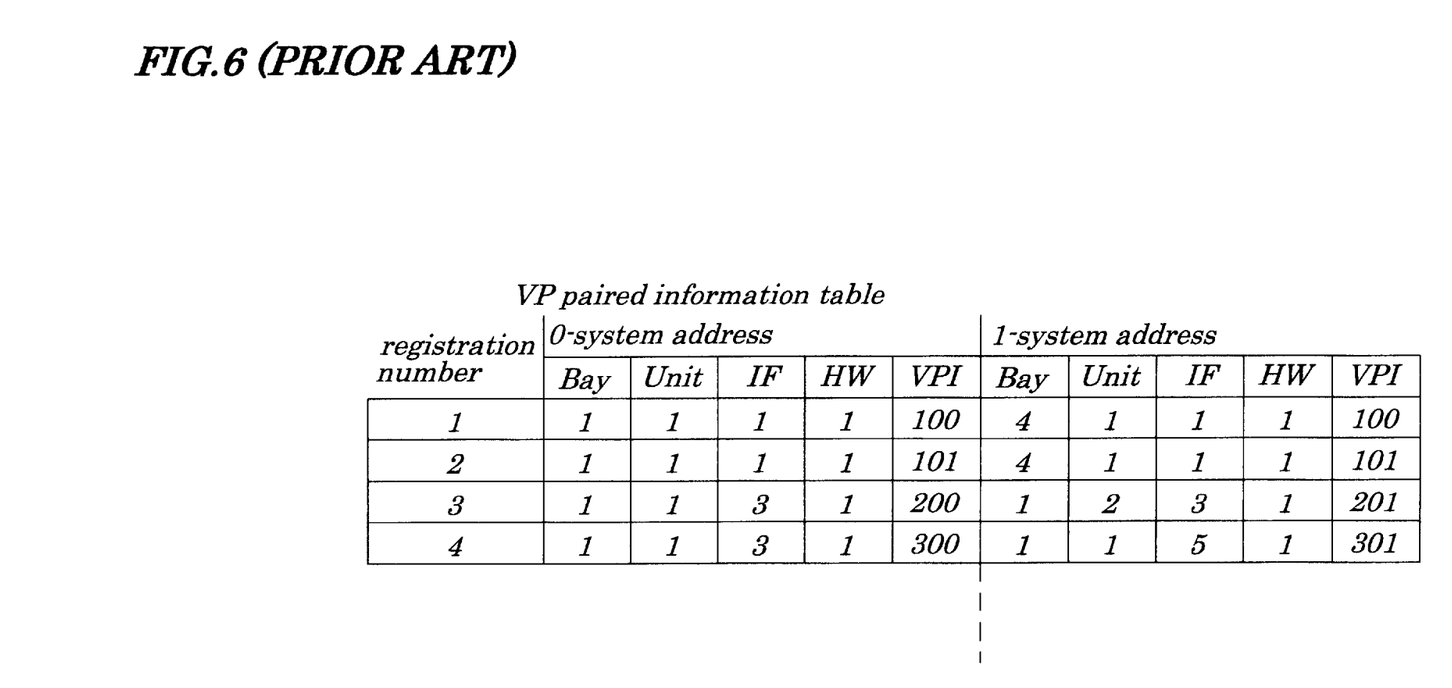
FIG. 6 is one example of a VP paired information table in a conventional ATM equipment.
Figure 7:
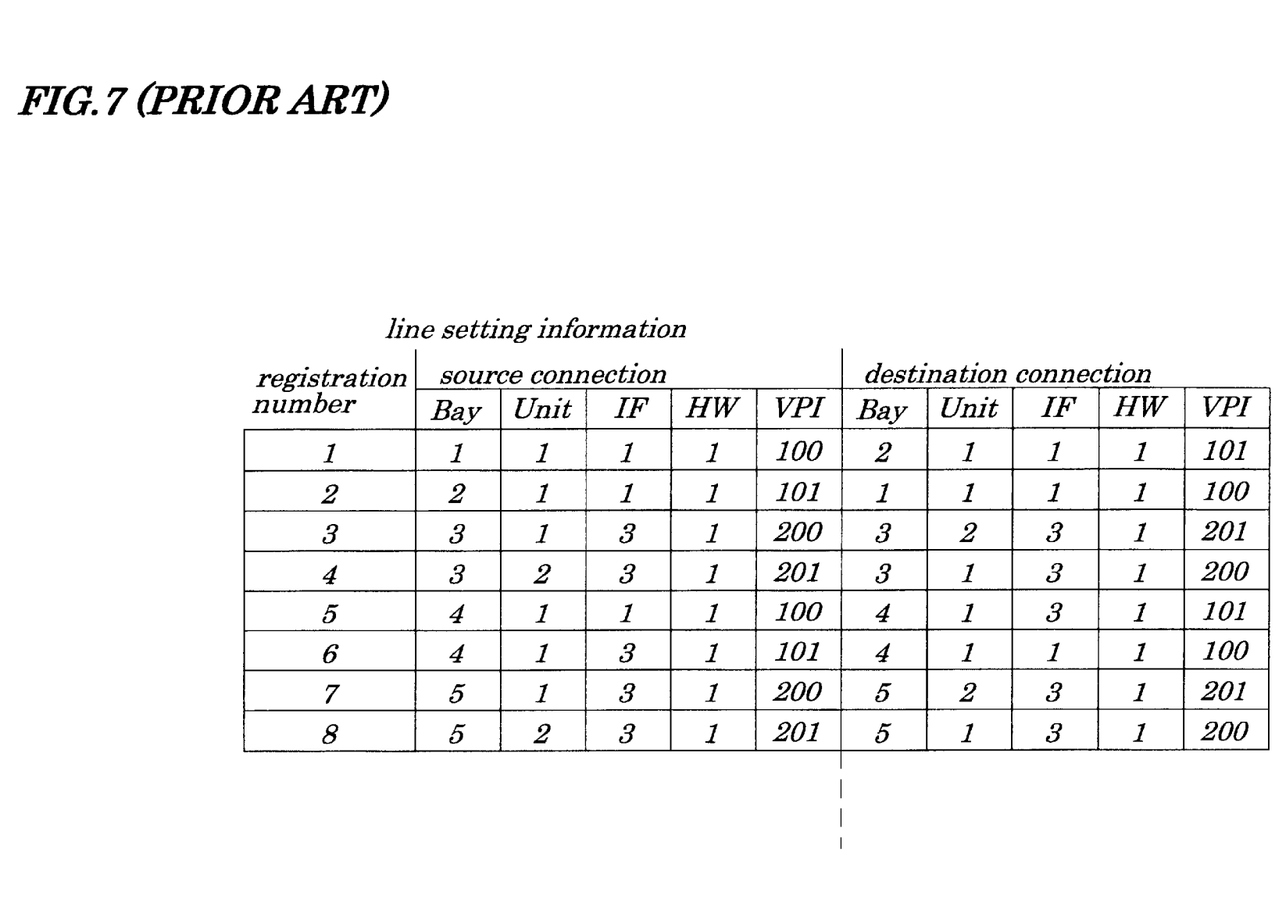
FIG. 7 is one example of a line setting information in the conventional ATM equipment.

FIG. 6 is one example of a VP paired information table 123 employed in the conventional ATM equipment and FIG. 7 is one example of a line setting information provided by the line setting information section 112 employed in the conventional ATM equipment.

The identification of each of the VPs is performed based on a number (Bay) of a frame in which the VP is housed, a unit number (Unit), a line interfacing section number (IF), asending and receiving circuit number (HW) stored in the line interfacing sections 124-1 and 124-2 and VPI.

Line setting information provided by the line setting information section 112 will be described by referring to FIG. 7. In FIG. 7, a source connection represents connection information to be inputted to the equipment and a destination connection represents connection information to be outputted from the equipment following a routing process. One registration allows setting of one directional VP connection to be made. For example, in the table in FIG. 7, in the case of a connection having the registration number being 1, a VP having the VPI being 100 to be inputted to a receiving section with a sending and receiving number (HW) to be stored in the interfacing sections 124-1 and 124-2, the frame number (Bay) being 1, the unit number (Unit) being 1, the line interfacing section number (IF) being 1 is outputted as the VP having the VPI being 101, from a sending section with the Bay being 2, the Unit being 1, the IF being 1 and the HW being 1.

Moreover, the connection for the registration number being 2 is in the direction opposite to that for the registration number being 1. (i.e., Input: Bay=2, Unit=1, IF=1, HW=1 and VPI=101; Output: Bay=1, Unit=1, IF=1, HW=1 and VPI=100). Therefore, the connection for the registration number 1 is paired with the connection for the registration number 2 to implement a bidirectional VP connection. Similarly, each of the connections for the pair of registration numbers 3 and 4; 5 and 6; and 7 and 8 implements the bidirectional VP connection.

Next, contents of the VP paired information table 123 will be described by referring to FIG. 6. In the table in FIG. 6, a 0- (zero) system address is a VP connection for an active VP in an initial state and a 1-system address is a VP connection for a standby VP. For example, in the case of the registration number being 1, one bidirectional VP connection composed of a combination of information about the Bay being 1, Unit being 1, IF being 1, HW being 1 and VPI being 100 is paired with the other bidirectional VP connection composed of a combination of information about the Bay being 4, Unit being 1, IF being 1, HW being 1 and VPI being 100 to implement VP pair connections. The setting for the active VP is composed of the combination of information about the Bay being 1, Unit being 1, IF being 1, HW being 1 and VPI being 100. In the VP paired information table 123 are contained all paired VP information of the VP to be used for the VP switching in the ATM equipment.

In the conventional ATM equipment, a known switching sequence is applied as a processing sequence between the node A 1-1 and node B 1-2. Operations of switching between the node A 1-1 and node B 1-2 will be described by referring to FIGS. 4 and 5.

First, operations of the node B 1-2 on the VP failure detecting side of the equipment are described. When a failure of the active VP 201-1 is detected by the line interfacing section 124-1 within the frame 102-1 and the unit 120-1, information about the failure of the active VP is transferred to the VP switching controlling section 122 on the control panel SYS-CONT110 through the control panels UNIT-CONT121-1 and BAY-CONT115-1. Then, the VP switching controlling section 122 retrieves information about the standby VP to be used for switching from the VP paired information table 123.

If the result of the retrieving have confirmed the standby VP to be the standby VP202-1 of the frame 102-2, the unit 120-2 and the line interfacing section 124-2 and the standby VP of the reverse directional active VP201-2 to be the standby VP202-2 of the line interfacing section 124-2, the states of the frame 102-2, the unit 120-2, the line interfacing section 124-2, the standby VP 202-1 and the standby VP202-2 are checked and verified by the BAY-CONT115-2.

If the switching is judged to be possible, a request for switching the VP to the standby VP202-2 is outputted from the line interfacing section 124-2 to the oppositely-disposed node A 1-1. After the request for the switching has been generated, the line setting information controlling section 111, when receiving a notice of the completion of the VP switching from the node A 1-1, is adapted to renew the line setting information 112 and to do VP switching processing.

Next, operations of the node A 1-1 to receive the VP switching request are described below.

When the line interfacing sections 124-2 mounted on the frame 102-2 and on the unit 120-2 detect the request, given from the node B 1-2, for the VP switching to the standby VP202-2, the request for the VP switching to the standby VP202-2 is transferred to the VP switching controlling section 122 on the SYS-CONT110 through the UNIT-CONT121-2 and the BAY-CONT115-2. Then, the VP switching controlling section 122 retrieves information about an active VP to be switched from the VP paired information table 123.

If the results of the retrieving have confirmed the active VP to be the active VP202-1 of the frame 102-1, the unit 120-1 and the line interfacing section 124-1 and the active VP of the reverse directional standby VP202-1 to be the active VP201-1 of the line interfacing section 124-1, the states of the frame 102-2, the unit 120-2, the line interfacing section 124-2, the standby VP 202-1 and the standby VP202-2 are checked and verified by the BAY-CONT115-2 and the UNIT-CONT121-2.

If the switching is judged to be possible, the line setting information controlling section 111 renews the line setting information 112 and performs the VP switching processing.

After the renewal, information about the completion of the switching is sent from the line interfacing section 124-2 to the oppositely-disposed node B 1-2 using the standby VP202-1. By the above processing, the VP switching is now complete.

Though the above-described conventional equipment is configured by using a plurality of frames, it may be configured by using a single frame and a plurality of units. If the equipment is constructed by the single frame, the system can be implemented by having the SYS-CONT110 serve concurrently as the BAY-CONT115-1.

On the other hand, another example of the method for implementing a VP switching function in the conventional ATM equipment is disclosed in Japanese Laid-open Patent Application No. Hei 05-235983. However, this application makes no reference to processing of the VP paired retrieving used at the time of switching of the VP.

However, the conventional method for implementing the VP switching function in the ATM equipment has the following problems to be solved.

In recent years, a capacity of the ATM communication equipment is becoming larger, causing an increase in the number of line interfacing sections to be handled in a system as well as the number of the VPs handled by the equipment on the whole. Therefore, if the VP paired information table is managed as a unit to cover the whole equipment, its table size becomes large, time required for retrieving a standby VP used at the time of switching the VP increases, thus causing an increase in switching time in the equipment on the whole. In the conventional ATM system, the size of the VP paired information table 123 controlled by the SYS-CONT110 increases in proportion to the number of the VPs to be handled by the whole equipment, thus causing an increase in time required for retrieving the VP constituting pair of the VPs from the VP paired information table. In addition, if many requests for the VP switching occur concurrently at different line interfacing sections, the switching processing is concentrated at the SYS-CONT110, causing time waiting for processing due to concurrent processing to be produced and leading to increased time for the VP switching.

SUMMARY OF THE INVENTION

In view of the above, it is an object of the present invention to provide asynchronous transfer mode communication equipment and a method for switching a virtual path (VP) of the same, which is provided with a function to perform VP switching processing in a short time by retrieving, at high speed, one VP constituting a pair of the VPs when a VP requiring the switching is detected by a control panel and also with a function to perform the VP switching processing in a short time by independent and distributed processing to be carried out by a control panel when the VP switching occurs at a plurality of places.

According to a first aspect of the present invention, there is provided asynchronous transfer mode communication equipment having a system controller to control whole equipment and a unit controller to control a connection with the VPs and having a configuration that a connection between nodes is made by active VPs and standby VPs, for performing switching from an active VP to a standby VP when a failure occurs in said active path, said unit controller including:

a VP paired information table showing a corresponding relationship between the active VPs and standby VP to be switched to each other;

a standby VP deciding means for retrieving the VP paired information table based on information about the active VP in which a failure has occurred and for deciding the standby VP used for the switching; and a VP switching means for performing the switching of the active VP based on information about the standby VP decided by the standby VP deciding means. Moreover, according to this first aspect, when any failure occurs in the connection line for the active VP, independently of the system controller used to control and manage the whole equipment, the unit controller being connected to the line having the failure is used to carry out the switching from the active VP to the standby VP to achieve a remedy of the failure in the paths. By configuring as described above, the ATM communication equipment can be provided which has a function to switch the VP in a short time by retrieving the VP to be paired with at high speed even when a VP which requires a unit controller for switching is encountered and which is capable of switching the VP in a short time by performing distributed processing of the switching even when the switching of the VP occurs at a plurality of places.

In the foregoing, a preferable mode is one wherein the VP paired information table is composed of information about only VPs being connected. The reason is that the unit controller may manage only VPs being connected to the unit controller itself. By configuring as described above, even if the VP switching occurs concurrently at a plurality of terminals of the unit controllers, the unit controller can independently perform retrieving of a VP to be used as one for the pair of the paths. Moreover, the VP paired information table is adapted to store information about active VPs and standby VPs connected to the unit controller and is constructed so that these VPs are associated with standby VPs respectively.

Also, a preferable mode is one wherein the VP switching means is used to output a request for switching from the active VP to the standby VP to the unit controller being connected to the active VP in which a failure has occurred and to perform switching from the active VP to the standby VP when receiving a response allowing the switching from said unit controller. By configuring above, since both unit controllers disposed at both ends of the VP having the failure confirm as to whether the switching is possible and performs the switching from the active VP to a standby VP, the VP switching levels between the unit controllers can be confirmed to each other.

Also, a preferable mode is one wherein the system controller is provided with a master VP paired information table to manage a corresponding relationship between active VPs and standby VPs, which cover the whole equipment. By incorporating the master VP paired information table, the system controllers can control the state of the VPs used in the whole ATM communication equipment.

Furthermore, a preferable mode is one wherein the system controller is used to renew the master VP paired information table after the switching from the active VP to a standby VP is performed by the unit controller. By renewing the master VP paired information table when the VP switching takes place, the system controller can control the newest state of the ATM communication equipment.

According to a second aspect of the present invention, there is provided a method for switching VPs in asynchronous transfer mode communication equipment having a system controller to control whole equipment and a unit controller to control a connection with the VPs and having a configuration that a connection between nodes is made by an active VP and a standby VP, for performing switching from the active VP to the standby VP when a failure occurs in the active path, including the steps of:

deciding, by the unit controller, a standby VP used for switching by retrieving a VP paired information table stored in advance based on information about the active VP in which a failure occurs; and performing, by the unit controller, switching of the active VP based on information about the standby VP decided by the above step.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
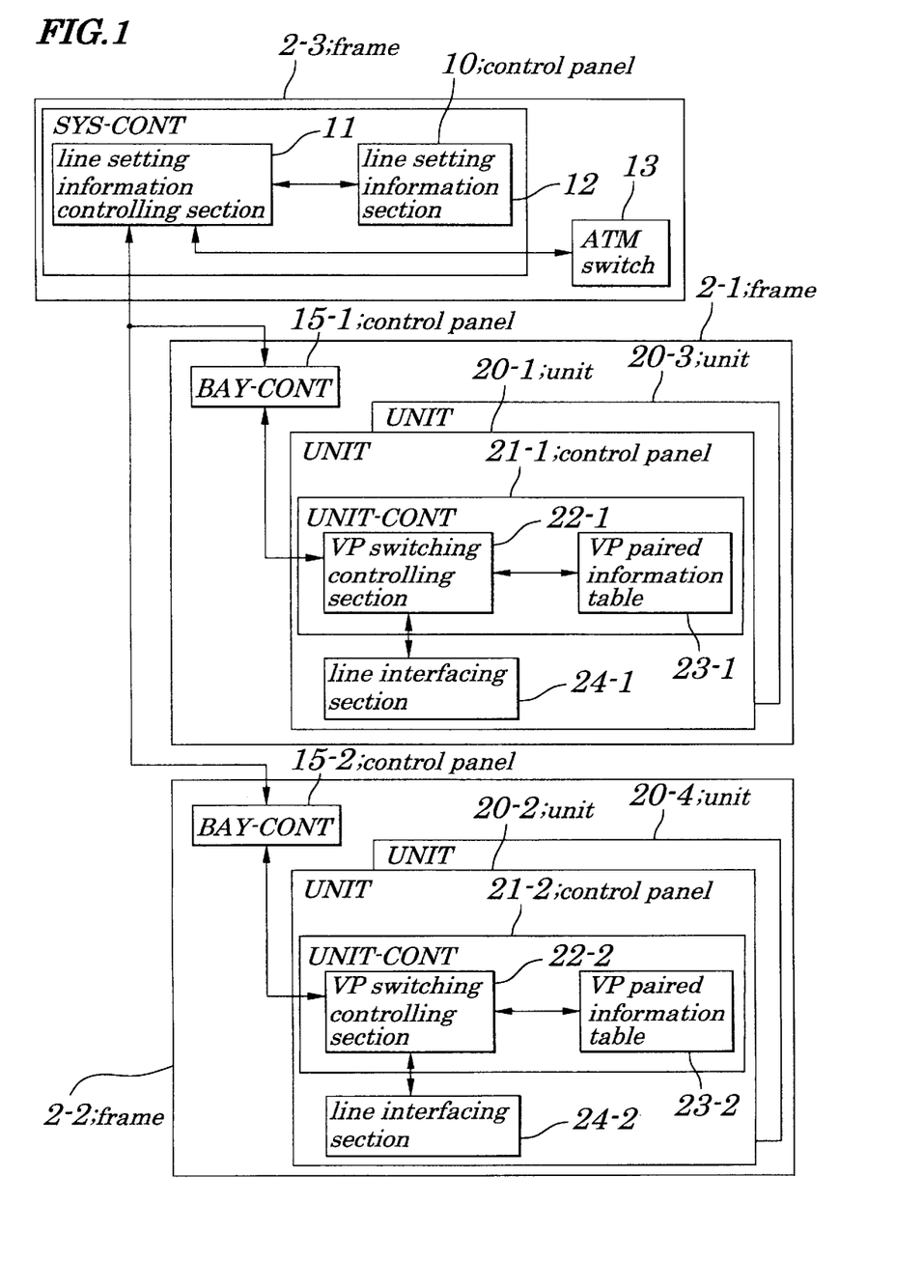
FIG. 1 is a schematic block diagram of configurations of an ATM (Asynchronous Transfer Mode) communication equipment according to a first embodiment of the present invention.

FIG. 1 is a schematic block diagram of configurations of asynchronous transfer mode (hereinafter referred to ATM) communication equipment according to a first embodiment of the present invention. As shown in FIG. 1, the ATM communication equipment comprised of a plurality of frames 2-1, 2-2 and 2-3 contains a control panel (SYS-CONT) 10 to control whole equipment, control panels (BAY-CONT)15-1 and 15-2 to control frames, control panels (UNIT-CONT) 21-1 and 21-2 to control units 20-1 to 20-4 and a package mounted on units, a line setting information section 12 and virtual path (VP) paired information tables 23-1 and 23-2.

The control panel SYS-CONT10 is provided with a line setting information controlling section 11 and with the line setting information section 12. Line setting information from the line setting information section 12 is fed to the UNIT-CONT21-1 and 21-2 on each of units 20-1 to 20-4 from the line setting information controlling section 11 through the BAY-CONT15-1 and 15-2 on each frame and set to each of line interfacing section 24-1 and 24-2. The line setting information from the line setting information section 12 is set to an ATM switch 13 through the line setting information controlling section 11.

The control panels UNIT-CONT21-1 and 21-2 have VP switching controlling sections 22-1 and 22-2 and VP paired information tables 23-1 and 23-2. The line setting information section 12 of whole equipment is controlled by the SYS-CONT10. The VP paired information tables 23-1 and 23-2 are controlled by the UNIT-CONT21-1 and 21-2.

Figure 2:
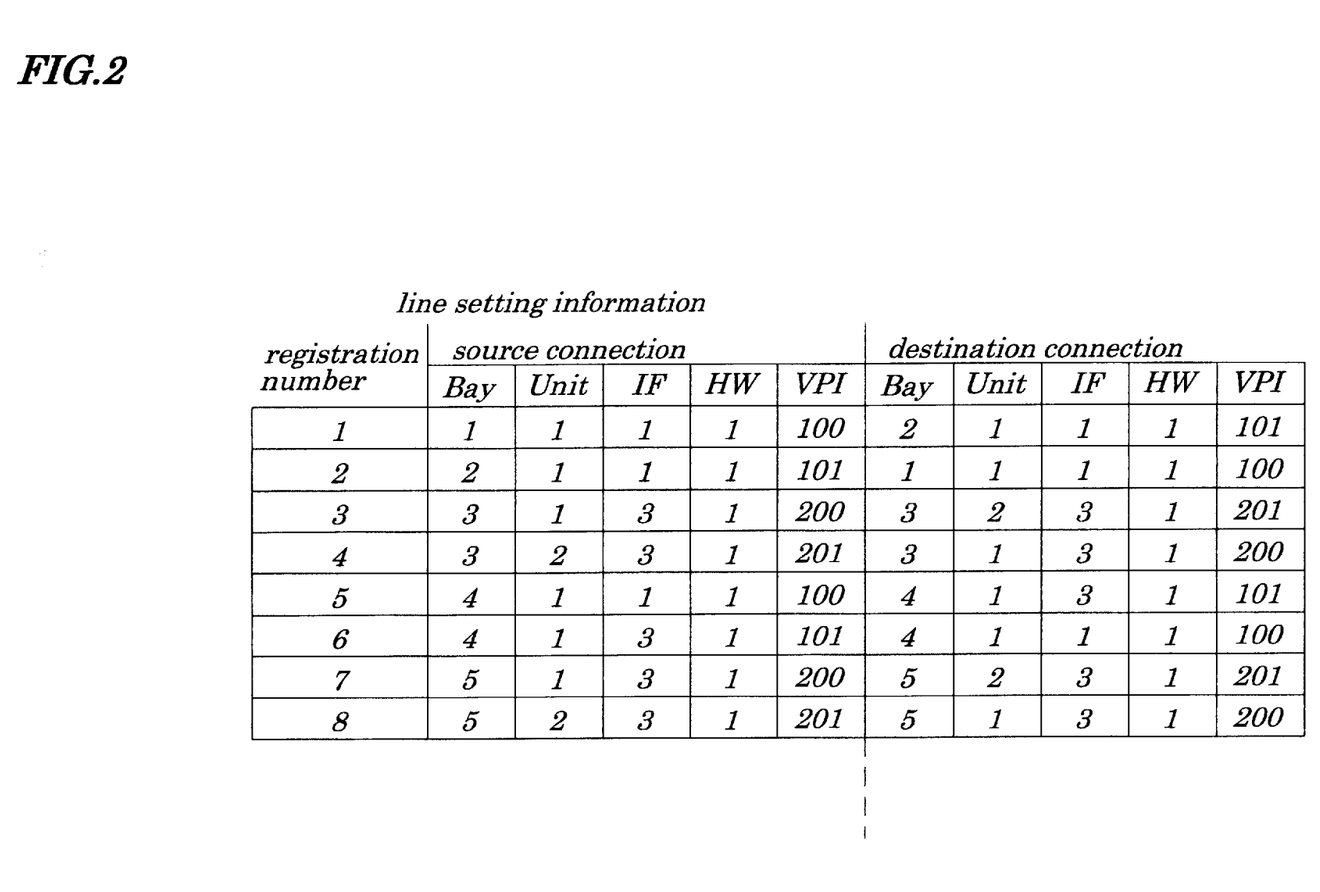
FIG. 2 is one example of a line setting information table according to the first embodiment of the present invention.
Figure 3:
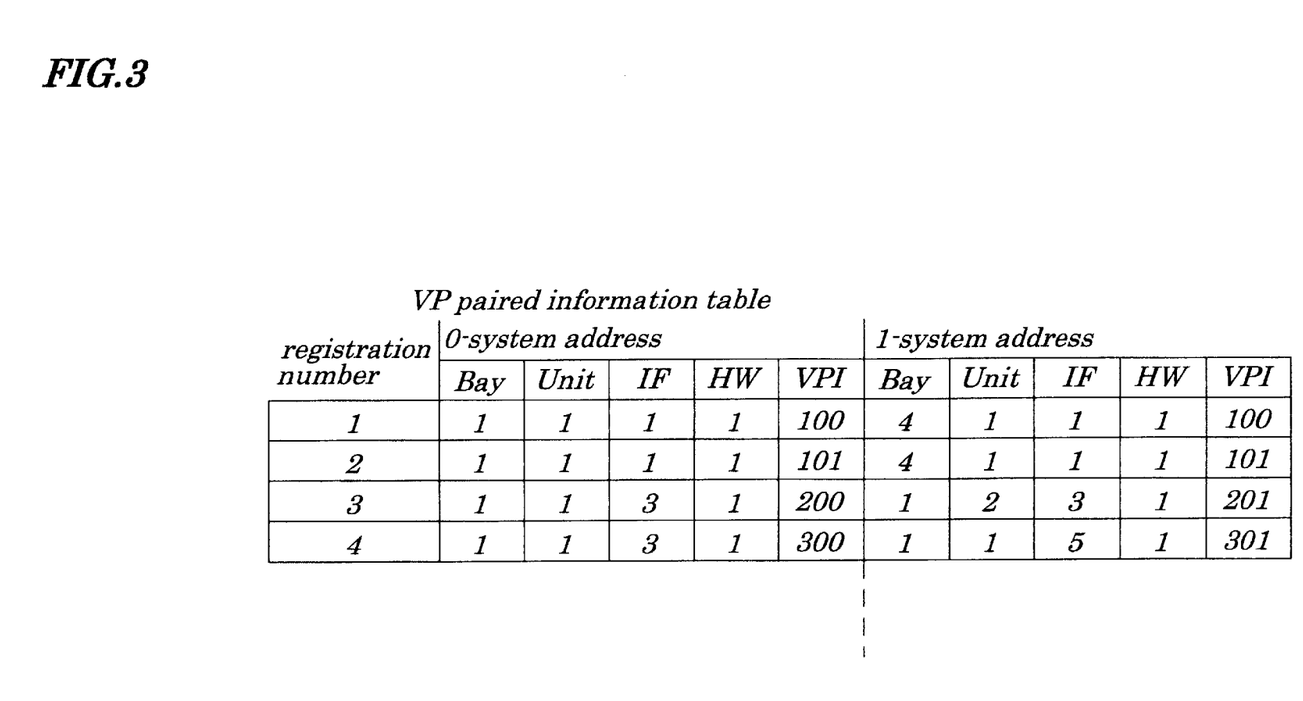
FIG. 3 is one example of a VP paired information table according to the first embodiment of the present invention.

Next, operations of the line setting information section 12 and the VP paired information tables 23-1 and 23-2 will be described. FIG. 2 is one example of a line setting information table according to the present embodiment. FIG. 3 is one example of VP paired information tables 23-1 and 23-2 to be handled by the control panels UNIT-CONT21-1 and 21-2 adapted to control each of line interfacing sections 24-1 and 24-2 in the frame with frame number 1 and in the unit with unit number 1. According to the present invention, the identification of the VP is performed based on a number (Bay) of the frame into which the VP is housed, unit number (Unit), line interfacing section number (IF), sending and receiving circuit number (HW) to be contained in the line interfacing sections 24-1 and 24-2 and VPI.

Contents of the line setting information provided by the line setting information section 12 will be described by referring to FIG. 2. In FIG. 2, a source connection represents connection information to be inputted to the equipment and a destination connection represents connection information to be outputted from the equipment following a routing process. One 16 registration allows setting of one-directional VP connection to be made. For example, in the table in FIG. 2, in the case of a connection having the registration number being 1, a VP having the VPI being 100 to be inputted to a receiving section with a sending and receiving number (HW) 1 to be stored in the interfacing sections, the frame number (Bay) being 1, the unit number (Unit) being 1, the line interfacing section number (IF) being 1 is outputted as the VP having, the VPI being 101, from a sending section with the Bay being 2, the Unit being 1, the IF being 1 and the HW being 1.

Moreover, the connection for the registration number being 2 is in the direction opposite to that for the registration number being 1. (i.e., Input: Bay=2, Unit=1, IF=1, HW=1 and VPI=101; Output: Bay=1, Unit=1, IF=1, HW=1 and VPI=100) Therefore, the connection for the registration number 1 is paired with the connection for the registration number 2 to implement a bidirectional VP connection. Similarly, each of the connections for the pair of registration numbers 3 and 4; 5 and 6; and 7 and 8 implements the bidirectional VP connection.

Next, contents of the VP paired information tables 23-1 and 23-2 will be described by referring to FIG. 3. In the table in FIG. 3, a 0 (zero)-system address represents VP connection information for an active VP in an initial state and a 1-system address represents VP connection information for a standby VP. For example, in the case of the registration number being 1, one bidirectional VP connection composed of a combination of the Bay being 1, Unit being 1, IF being 1, HW being 1 and VPI being 100 is paired with the other bidirectional VP connection composed of a combination of information about the Bay being 4, Unit being 1, IF being 1, HW being 1 and VPI being 100 to implement VP pair connections. The setting for the active VP is composed of the combination of information about the Bay being 1, Unit being 1, IF being 1, HW being 1 and VPI being 100.

Therefore, the VP to be handled by the UNIT-CONT21-1 and 22-2 contains VPs set to all line interfacing sections in the unit having the unit number 1 and VPs set to the line interfacing section in the unit as standby VPs for other VPs, which constitute a subset of the VPs set in the whole equipment.

Since the paired VPs registered in the VP paired information tables 23-1 and 23-2 become VPs set as a pair, out of the VPs to be handled by the UNIT-CONT21-1 and 21-2, they constitute a subset of the paired VP set in the whole equipment and a frame number and a unit number of either of the 0-system address or 1-system address are all 1 and 1. On the other hand, contents of the VP paired information tables 23-1 and 23-2 vary depending on the UNIT-CONT21-1 and 21-2 to be mounted. This is because a different VP is handled between the UNIT-CONT21-1 and 21-2.

The operations of the ATM equipment having such configurations described above according to the first embodiment by referring to FIGS. 1 and 4. The conventional switching sequence employed in the general ATM equipment is applied to the processing sequence between the nodes A 1-1 and B 1-2. Operations within the nodes A and B are described below.

Operations within the nodes A 1-1 and B 1-2 of the present invention differ from those of the conventional equipment in a site for retrieving one VP constituting a pair of the VPs and its processing.

First, operations of the node B 1-2 on the VP failure detecting side of equipment are described. When a failure of the active VP 201-1 is detected by the line interfacing section 24-1 within the frame 2-1 and the unit 20-1, information about the failure of the active VP 201-1 is given to the VP switching controlling section 22-1 on the control panel UNIT-CONT21-1. Then, the VP switching controlling section 22-1 retrieves the standby VP to be used for switching from the VP paired information table 23-1.

If the results of the retrieving have confirmed the standby VP to be the standby VP202-1 of the frame 2-2, the unit 20-2 and the line interfacing section 24-2 and the standby VP of the reverse directional standby VP201-2 to be the standby VP-202-2 of the line interfacing section 24-2, the states of the frame 2-2, the unit 20-2, the line interfacing section 24-2, the standby VP 202-1 and the standby VP202-2 are checked and verified by the BAY-CONT15-2 and the UNIT-CONT21-2.

If the switching is judged to be possible, a request for switching the VP is outputted from the line interfacing section 24-2 to the oppositely-disposed node A 1-1 by using the standby VP202-2. After the request for the switching has been generated, the line setting information controlling section 11, when receiving a notice of the completion of the VP switching from the node A 1-1, is adapted to renew information of the line setting information section 12 and to do the VP switching processing.

Next, operations of the node A 1-1 to receive the VP switching request are described below.

When the line interfacing section 24-2 in the frame 2-2 and the unit 20-2 detects the request for the VP switching to the standby VP202-2 received from the node B 1-2, the request for the VP switching to the standby VP202-2 is transferred to the VP switching controlling section 22-2 on the UNIT-CONT21-2.

Then, the VP switching controlling section 22-2 retrieves an active VP to be switched from the VP paired information table 23-2. If the results of the retrieving have confirmed the active VP to be the active VP201-2 of the frame 2-1, the unit 20-1 and the line interfacing section 24-1 and the active VP of the reverse directional standby VP201-1 to be the active VP201-1 of the line interfacing section 24-1, the states of the frame 2-2, the unit 20-2, the line interfacing section 24-2, the standby VP 202-1 and the standby VP202-2 are checked and verified by the BAY-CONT15-2 and the UNIT-CONT21-2. If the switching is judged to be possible, the line setting information controlling section 11 is adapted to renew the line setting information section 12 and to do the VP switching processing. Then, after the renewal, a notice of completion of the switching is outputted by using the standby VP202-1 toward the oppositely-disposed node B 1-2 from the line interfacing section 24-2. By the processing described above, the VP switching is now complete. Therefore, the VP switching controlling sections 22-1 and 22-2 constitute the standby VP deciding means and the VP switching means.

Second Embodiment

Basic configurations of a second embodiment of the present invention are the same as those of the first embodiment. Same reference numbers in the second embodiment designate corresponding parts in the first embodiment. According to the second embodiment, with the VP paired information tables 23-1 and 23-2 are left in the units 20-1 to 20-4 as in the case of the first embodiment, the VP paired information table for the whole equipment is mounted within the SYS-CONT10. Moreover, by using the VP paired information table in the SYS-CONT10 as a master table, all VP paired information is collected, and by using the VP paired information tables 23-1 and 23-2 in each of the UNIT-CONT21-1 and 21-2 as slave tables, the VP paired information about the VPs to be handled by each of the UNIT-CONT21-1 and 21-2 is transferred from the VP paired information table.

The retrieving processing of the paired VP is done by using the VP switching controlling sections 22-1 and 22-2 and the VP paired information tables 23-1 and 23-2 in the UNIT-CONT21-1 and 21-2. To control a state appearing after the execution of the switching based on the retrieving results, the VP paired information table mounted in the SYS-CONT10 and used as the master table to be applied to the whole equipment is used.

Thus, by using the VP paired information table for the whole equipment mounted on the SYS-CONT10 to control such states as may be subject to changes, uniqueness of information for the equipment on the whole can be ensured.

On the other hand, when the retrieving processing is done in the case of no changes in the state for the VP switching, by using the VP switching controlling sections 22-1 and 22-2 and the VP paired information tables 23-1 and 23-2 in the UNIT-CONT21-1 and 21-2, the occurrence of concurrent retrieving processing and of time waiting for processing as well as the increase in time required for the VP switching can be avoided.

Thus, by dividing the VP paired information tables 23-1 and 23-2 for every VP set to the line interfacing sections 24-1 and 24-2, the retrieving speed can be increased and the retrieving time can be shortened. Moreover, by installing the VP switching controlling sections 22-1 and 22-2 for distributed processing, the concurrent processing and the occurrence of time waiting for processing can be avoided.

As described above, according to the present invention, the ATM communication equipment can be provided which has a function to switch the VP in a short time by retrieving the VP to be used for switching at high speed even when a VP requiring a unit controller for switching is encountered and which is capable of switching the VP in a short time by performing distributed processing of switching each VP even when the switching of the VP occurs concurrently at a plurality of places.

Also, according to the present invention, even if the VP switching occurs concurrently at a plurality of terminal unit controllers, the unit controller can independently perform retrieving of a VP to be used for switching.

Furthermore, since both unit controllers disposed at both ends of a VP having a failure confirm as to whether the switching is possible and perform the switching to a standby VP, the VP switching levels between the unit controllers can be confirmed to each other.

Also, by incorporating the master VP paired information table, the system controllers can control the state of the VPs used for the whole ATM communication equipment.

Also, by renewing the master VP paired information table when the VP switching takes place, the system controller can control the newest state of the ATM communication equipment.

It is thus apparent that the present invention is not limited to the above embodiments but may be changed and modified without departing from the scope and spirit of the invention.

Finally, the present application claims the priority of Japanese Patent Application No. Hei 11-047108 filed on Feb. 24, 1999, which is herein incorporated by reference.

What is claimed is:

1. Asynchronous transfer mode communication equipment having a system controller to control whole equipment and a plurality of unit controllers, each unit controller of said plurality of unit controllers controlling a connection with virtual paths and having a configuration that a connection between nodes is made by active virtual paths and standby virtual paths, for performing switching from said active virtual path to said standby virtual path when a failure occurs in said active path, each unit controller comprising:

a virtual path paired information table showing a corresponding relationship between said active virtual path and said standby virtual path to be switched;

a standby virtual path deciding means for retrieving said virtual path paired information table based on information about said active virtual path in which a failure occurs and for deciding said standby virtual path to be used for switching; and a virtual path switching means for performing switching of said active virtual path based on information about said standby virtual path decided by said standby virtual path deciding means, wherein the standby virtual path deciding means of each unit controller retrieves and decides the standby virtual path when a failure occurs in the active path, independent of said system controller.

2. The asynchronous transfer mode communication equipment according to claim 1, wherein said virtual path paired information table is composed of information about only virtual paths being connected.

3. The asynchronous transfer mode communication equipment according to claim 1 or 2, wherein said virtual path switching means is used to output a request for switching from said active virtual path to said standby virtual path to a unit controller being connected to said virtual path in which a failure occurs and to perform switching from said active virtual path to said standby virtual path when receiving a response allowing the switching from said unit controller.

4. The asynchronous transfer mode communication equipment according to claim 3, wherein said system controller is provided with a master virtual path paired information table to manage a corresponding relationship between said active virtual paths and said standby virtual paths, which cover the whole equipment.

5. The asynchronous transfer mode communication equipment according to claim 4, wherein said system controller is used to renew said master virtual path paired information table after the switching from said active virtual path to said standby virtual path is carried out by said unit controller.

6. The asynchronous transfer mode communication equipment according to any one of claims 1 and 2, wherein said system controller is provided with a master virtual path paired information table to manage a corresponding relationship between said active virtual paths and said standby virtual paths, which cover the whole equipment.

7. The asynchronous transfer mode communication equipment according to claim 6, wherein said system controller is used to renew said master virtual path paired information table after the switching from said active virtual path to said standby virtual path is carried out by said unit controller.

8. The asynchronous transfer mode communication equipment according to claim 1, wherein the standby virtual path deciding means of each unit controller retrieves and decides the standby virtual path when a failure occurs in the active path, independent of said system controller and independent of the standby virtual path deciding means of other unit controllers of said plurality of unit controllers.

9. The asynchronous transfer mode communication equipment according to any one of claims 1 and 8, wherein said system controller is provided with a master virtual path paired information table to manage a corresponding relationship between said active virtual paths and said standby virtual paths, which cover the whole equipment.

10. The asynchronous transfer mode communication equipment according to claim 9, wherein said system controller is used to renew said master virtual path paired information table after the switching from the active virtual path to the standby virtual path is carried out by any one of the unit controllers.

11. A method for switching virtual paths in asynchronous transfer mode communication equipment having a system controller to control whole equipment and a plurality of unit controllers, each unit controller of said plurality of unit controllers managing a connection with virtual paths and having a configuration that a connection between nodes is made by active virtual paths and standby virtual paths, for performing switching from said active virtual path to said standby virtual path when a failure occurs in said active path, comprising the steps of:

deciding, by said unit controller, a standby virtual path used for switching, by retrieving a virtual path paired information table stored in advance in said unit controller, based on information about said active virtual path in which a failure occurs; and performing, by said unit controller, switching of said active virtual path based on information about said standby virtual path decided by the above step, wherein said step of deciding is done, when the failure occurs, independent of the system controller.

12. The method for switching virtual paths according to claim 11, wherein said step of deciding is done, when the failure occurs, independent of the system controller and independent of any step of deciding done by other unit controllers of the plurality of unit controllers.

* * * * *